Figure 1:
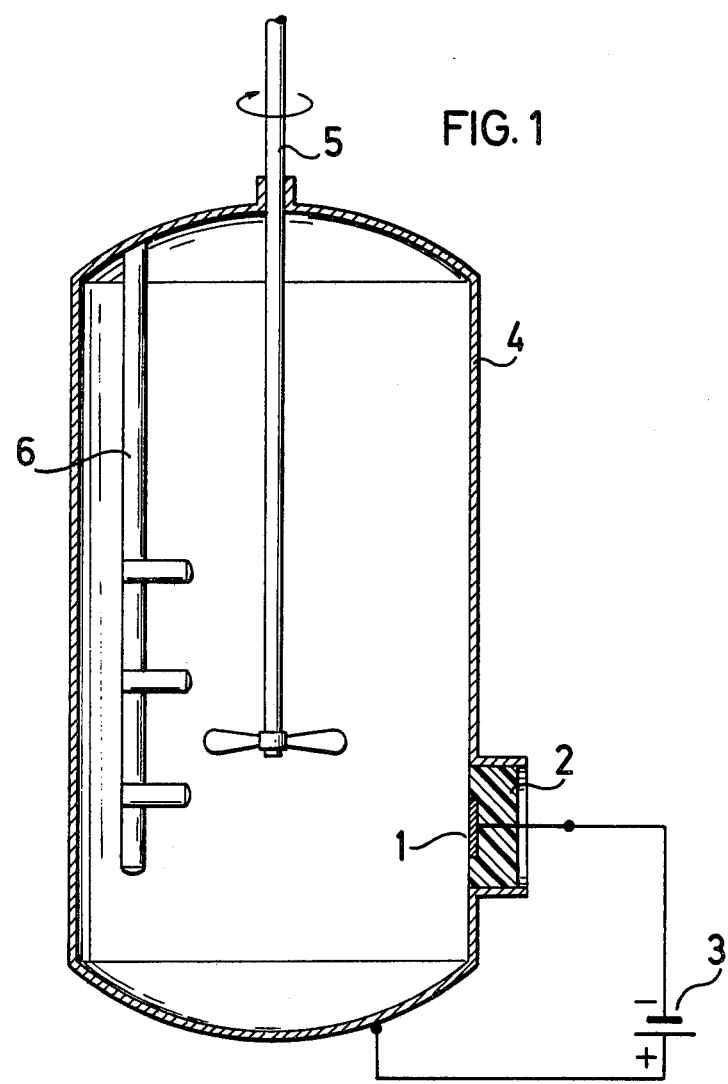

United States Patent [19]

Scheibler et al.

[11] 4,090,014
[45] May 16, 1978

[54] PROCESS AND APPARATUS FOR POLYMERIZING α-ETHYLENICALLY UNSATURATED MONOMERS IN AQUEOUS MEDIA

[75] Inventors: Hermann Scheibler; Kasimir Ruchlak, both of Burgkirchen, Alz; Christoph Heinze, Burghausen, Salzach; Horst Wolff, Neuotting, all of Germany

[73] Assignee: Hoechst Aktiengesellschaft, Frankfurt am Main, Germany

[21] Appl. No.: 716,210

[22] Filed: Aug. 20, 1976

[30] Foreign Application Priority Data

Aug. 26, 1975 Switzerland .................. 11070/75

[51] Int. Cl.$^2$ .................. C08F 2/18; C08F 14/06
[52] U.S. Cl. .................. 526/62; 526/330; 526/344; 526/345

[58] Field of Search .................. 526/62

[56] References Cited

U.S. PATENT DOCUMENTS

3,970,610  7/1976  Ruchlak et al. .................. 526/62

Primary Examiner—Alan Holler
Attorney, Agent, or Firm—Connolly and Hutz

[57] ABSTRACT

α-Ethylenically unsaturated monomers are polymerized in aqueous media in a vessel with electrically conductive inner surface, in which partial areas of the inner surface covered by liquid are electrically insulated from the remaining surface areas and conductively connected therewith by an external source of current. In this manner the formation of deposits on the wall of vessel is hindered or suppressed.

4 Claims, 7 Drawing Figures

PROCESS AND APPARATUS FOR POLYMERIZING α-ETHYLENICALLY UNSATURATED MONOMERS IN AQUEOUS MEDIA

This invention relates to a process and apparatus for polymerizing α-ethylenically unsaturated monomers in aqueous media in a vessel with electrically conductive inner surface, in which partial areas of the inner surface covered by liquid are electrically insulated from the remaining surface areas and conductively connected therewith by an external source of current.

In the polymerization of α-ethylenically unsaturated monomers yielding products that are insoluble in aqueous media the reaction products often form deposits on the surfaces of the reactor wall. These deposits may cause various troubles in the course of reaction and affect the quality of the final products. The troubles are, for example, that after a certain reaction period the dissipation of the reaction heat is hindered. When the deposit detaches or peels off during polymerization the polymer is contaminated. Such contaminated products often cause difficulties in further processing, for example into shaped structures, and the quality of the products obtained is reduced, for example by heterogeneities, for example the known fish eyes. It is, therefore, necessary to clean the polymerization reactor from time to time, depending on the formed deposit, and to remove the deposit. For this cleaning automatic mechanical devices are known, but they do not always give the desired result so that the vessel has to be cleaned by hand, especially in the case of firmly adhering deposits. This procedure is time-consuming and expensive. When polymerization is started again after cleaning, a product of reduced quality is often obtained for a shorter or longer period. Additionally, when a polymerization in which physiologically harmful monomers are used is discontinued, special measures have to be taken to avoid noxious emissions into the atmosphere. Hence, bearing in mind all these diffficulties, it is desirable to continue polymerization as long as possible without formation of deposits.

Numerous processes have been proposed to avoid the formation of wall deposits. In many processes the formation of deposits is suppressed by using definite polymerization conditions and adding certain substances to the polymerization baths. All these processes have the drawback that the conditions must be harmonized with the additives and, therefore, the products obtained do not have always the optimum properties for the intended use and sometimes the physiological safety is not warranted. Moreover, in most cases, the additives augment the material costs.

Other processes have been proposed according to which the formation of deposits is avoided by lining the reactor inner wall. Measures of this type are often effective with specific processes only and in other polymerizations they have a weak effect or fail completely. With thicker linings the heat transition of the polymerization mixture to the reactor wall, which is often used to heat the polymerization mixture, is impeded.

It is also known to strip off the formed deposits mechanically during polymerization and to keep clean the reactor wall in this manner. This process requires relatively expensive built-in elements in the reactor, which are not protected against the formation of deposits and have to be cleaned from time to time, which operation requires undesired shutoff times. Moreover, the scraped off, mostly coarse-grained, deposit mingles with the fine-grained polymer in the polymerization mixture and contaminates same so that in the thermoplastic processing the flow of the polymer is hindered and the feared fish-eyes are formed.

Recently, processes have been proposed in which most of the aforesaid disadvantages are avoided. In these processes the polymerization mixture is contacted with an electrode and between this electrode and the wall and the elements in the polymerization vessel an electric potential difference is produced. In one of the aforesaid processes the electrode is made of a less noble material, for example aluminium, zinc, or magnesium, than the wall of the polymerization vessel (iron). By short-circuiting the electrode with the wall of the vessel an electric element is produced causing a current flow through the polymerization mixture with separation of hydrogen at the wall of the vessel. This process, described for the manufacture of acrylonitrile polymers, has the drawback that the dissolving electrode of base metal constantly sets free metal ions into the polymerization mixture contaminating same and the polymer made therefrom. When a polymer of this type is further processed, the traces of metal contained therein may cause an undesired precipitation which impairs the transparency of the product made therefrom and the processing properties of the polymer. The contamination may also result in a reduction of the thermostability.

Another process of this type makes use of an immersion electrode which is electrically insulated from the wall of the vessel and connected with said wall via an external current source, the electrode being connected as anode. A third process, which has been developed especially for the suspension polymerization of vinyl chloride, is based on a similar principle with the exception that the electrode is connected as cathode and the wall of the vessel as anode.

All three electric processes to suppress the deposit formation have the drawback that the immersion electrode constitutes an additional element in the reaction vessel which has a disturbing effect, especially when a plurality of electrodes or electrodes having relatively large dimensions are used to ensure a uniform distribution of current in the bath. This may detrimentally affect the uniform mixing of the polymerization mixture and hence the homogeneity of the product obtained. In many cases, the mechanical and firm fixation of the electrodes in the vessel presents difficulties, especially when the polymerization mixture is intensely stirred, which may cause the electrodes to vibrate. This is the reason why chemically resistant but brittle insulating materials, for example glass, cannot be used in many cases. If large lumps are formed, which may happen in the polymerization as a result of an uncontrolled or unforeseen course of reaction, the lumps may pile up at the electrode which breaks and possibly damages other built-in elements, for example the stirrer. In some polymerizations the wall of the vessel may remain free from deposit whereas the electrode is slowly covered with a layer which must be removed as soon as a certain thickness is reached. This is relatively complicated in the known processes, the more so as no water under pressure can be used which might cause tearing of the electrode.

It is the object of the present invention to disclose a process which does not have the aforesaid disadvantages. This is achieved by a process for polymerizing α-ethylenically unsaturated monomers in aqueous media in the presence of catalysts and further polymerization auxiliaries in a vessel having an electrically conductive inner surface and optionally provided with built-in elements, the electrically conductive inner surface and the said elements being connected with at least one electrode insoluble in the liquid polymerization medium and electrically insulated from the wall of the polymerization vessel and built-in elements, wherein at least a partial area of the inner surface of the vessel and/or built-in elements is used as insoluble electrode, which area is electrically insulated from the remaining surface areas and covered with liquid at least partially and preferably entirely.

The number of insulated partial areas serving as electrode is limited by the available inner surface of the polymerization vessel, by the outer surface of the built-in elements and by economical considerations. It proved advantageous to operate with 2 to 24 partial areas insulated from the remaining surface areas. Especially good results are obtained with 3 to 12 insulated partial areas. The partial areas used as electrode should be covered with the aqueous medium in which the polymerization is carried out at least partially, as otherwise the desired effect does not occur. It may be sufficient, however, when the insulated partial areas are covered with a second, non aqueous phase having a sufficient electrical conductivity and being in contact with the aqueous phase. The partial areas are preferably covered wholly with liquid as the danger of a formation of conductive deposits is particularly pronounced at the boundary surface between liquid and gaseous phase, which deposits bridge the insulating layer and thus cancel the electric potential difference produced by the outer source of current between partial area and remaining surface area.

Depending on the type of polymerization, the monomers and the auxiliaries used, the electric current flowing through the polymerization medium as a result of the potential difference can vary within wide limits. Generally, good results are obtained with current densities approximately in the range of from 5 to about 3,000, preferably 20 to 800 mA/m$^2$, of the surface to be kept free from deposit without insulated partial areas. The current density obtained depends on the voltage of the current source, the construction of the vessel, the reaction medium and on the type and amount of substances added to improve the conductibility, for example salts added as buffer substances. With various types of polymerization, it may be advantageous to choose a higher current density at the beginning of polymerization when the tendency to deposit formation is very great and then to continue with a lower current density later on. The optimum external voltage can be determined by a simple preliminary experiment. Its upper limit is defined by the fact that an anodic dissolution of the wall of the vessel and of the built-in elements as well as of the partial areas serving as electrode has to be substantially avoided. The upper limit of voltage is different, depending on the type of surface and of polymerization liquid.

The reaction medium has to be chosen in such a manner that in comparison with the polymerization under the same conditions but without current flow a noticeable anodic dissolution of the walls of the vessel and the built-in elements does not take place. The term "noticeable anodic dissolution" is intended to include those cases in which there is practically no higher dissolution than in a reaction without current, as well as those in which the dissolution is 5 or even 10 times higher. In the latter case, it should be taken into consideration that in the known polymerization without current flow a certain dissolution of the reactor wall cannot be avoided and losses of reactor material occur during the frequent removal of the wall deposits, which losses may sometimes be much higher than the aforesaid limiting value. This limiting value may still be higher if other advantages of the process of the invention justify a stronger wear of the reactor.

The polymerization is carried out at a pH of the starting mixture of from 2 to 12, preferably 3 to 10 and more preferably 5 to 8. To adjust the pH acids or bases may be added, for example phosphoric acid, citric acid, carboxylic acid such as acetic acid, hydrochloric acid, sulfuric acid; alkali metal hydroxides, or ammonia. If corrosive media are used, such as hydrochloric or sulfuric acid, the vessel should be lined with a noble metal. To adjust the pH buffer substances are preferably added, for example alkali metal acetate, citrate, dihydrogen phosphate, hydrogen phosphate, or bicarbonate.

When the conductivity of the polymerization medium is not high enough to reach a sufficient current density, substances improving the conductivity may be added, for example water-soluble salts, especially neutral salts, besides the aforementioned salts used as buffer substances. There are mentioned by way of example neutral alkali metal sulfates, chlorides or nitrates.

To avoid undesired secondary reactions which may take place as a result of the current flow through the polymerization mixture, a lower current density can be chosen or other reaction conditions can be modified, especially the concentration of the mixture.

The process of the invention is preferably carried out with direct-current. Whether it is advantageous to connect as anode the insulated partial areas used as electrode or the remaining surface areas depends on the type of polymerization and the monomers used. For the manufacture of acrylonitrile polymer the insulated partial areas used as electrode are preferably connected as anode, whereas in the suspensions polymerization of vinyl chloride the remaining surface areas are connected as anode and the insulated partial areas as cathode.

Under certain conditions, for example in the emulsion polymerization of vinyl chloride, the insulated partial areas may gradually cover with a polymer deposit. In this case it proved advantageous to choose a reaction vessel with a plurality of insulated partial areas, to product an electrical potential difference with respect to the other surface areas with some of them only, preferably half of the insulated partial areas (a) by connecting an external current source and to short-circuit the remaining insulated partial areas (b) with the remaining surface areas so that after some time partial areas (b) can be wholly or partially exchanged with partial areas (a) by change of connection. If necessary, this procedure can be repeated several times. In this manner, a sufficient number of partial areas free from deposit are always available as electrodes.

If the aforesaid process is not sufficient to free from deposit the partial areas serving as electrode it can be modified in that the covered partial areas (b) are not short-circuited with the other surface areas but connected via a second current source producing a preferably lower potential difference with reversed sign with respect to the current source connecting partial areas 1. heating or cooling of the reactor wall by a liquid medium;
2. cooling with reflux;
3. stirring, optionally with the use of baffles;
4. spraying with a liquid, preferably water of aqueous solutions, of the inner surfaces of the vessel and of the built-in elements which are not covered by liquid;
5. complete or partial stripping of the reactor wall with a tool of electrically insulating material;
6. heating of the polymerization mixture of direct introduction of steam;
7. polymerization above or below the saturation vapor pressure of the monomers;
8. supply of one or several of the following substances during polymerization: water, aqueous solutions, monomers, catalysts, further polymerization auxiliaries, optionally while maintaining constant the filling volume in the polymerization vessel;
9. polymerization in vessels having dimensions according to DIN 28 011 to 28 014 inclusive, especially those having a capacity of over 30 to about 400 $m^3$;
10. polymerization in oblong vessels with a ratio of length to diameter (internal values) of 5:1 to 50:1;
11. agitation at two or more than two different speeds during polymerization;
12. polymerizing at two or more than two different temperatures.

The present invention also provides an apparatus comprising a polymerization vessel with electrically conductive inner surface and optionally built-in elements for the polymerization of α-ethylenically unsaturated monomers in aqueous media with the use of at least one insoluble electrode which is electrically insulated from the wall of the vessel and the built-in elements, if any, and in electric connection with the inner surface of the vessel via an external current source, wherein a partial area of the inner surface of the vessel and/or the built-in elements covered by liquid during polymerization acts as electrode.

The insulated partial areas serving as electrode preferably consist of a more noble material than the remaining surface areas. The expression more noble material is intended to indicate an electrically conductive material the standard electrode potential of which is more positive or less negative than the standard electrode potential of the remaining surface areas (cf. d'Ans-Lax, Taschenbuch fur Chemiker und Physiker, edition 1970, volume 3, pages 252 et seq.). When the wall of the vessel is made of iron much more noble materials are, for example, nickel, tin, lead, copper, silver, gold, platinum metals and graphite. According to a preferred embodiment the insulated partial areas serving as electrode are made of the same material as the remaining surface areas. The expression "remaining surface areas" means the portions of the internal wall of the polymerization vessel and/or the built-in elements which do not belong to the insulated partial areas and are not made of insulating material. The remaining surface areas are made, for example, of iron, steel, or stainless steel, or lined with stainless steel or a noble metal, for example with nickel or silver.

The material for insulating the partial areas from the remaining surface areas should be substantially insoluble in the polymerization medium. Suitable materials are, for example, glass, porcelain, ceramic, fluorine containing plastic materials, for example polytetrafluoroethylene, optionally reinforced by mineral fillers such as glass fibers, phenolformaldehyde condensation products optionally modified by amine, polyolefins such as polyethylene and polypropylene, optionally crosslinked polyurethanes, polyesters, chlorinated hydrocarbons such as chlorinated polyethylene, optionally afterchlorinated polyvinyl chloride and polyamides.

With larger polymerization vessels, for example having a capacity above 5 $m^3$, it proved advantageous to distribute several insulated partial areas serving as electrode uniformly over that portion of the inner surface of the polymerization vessel which is covered with liquid during polymerization. In this case the built-in elements have no insulated partial areas serving as electrode.

The individual partial area may have the most different geometrical shape, for example the shape of a triangle, rectangle, polygon, an ellipse, or a narrow, oblong straight or curved band, preferably the partial area has a circular shape.

The insulating layer which separates the partial area from the remaining surface areas should have a breadth of from 5 to 200 mm, preferably 10 to 100 mm. With an insulating layer having a breadth of less than 5 mm the current flow through the polymerization mixture generally concentrates in the border zones of the areas insulated from one another. Of course, the insulating layers could have a breadth of over 200 mm, but in this case they cover too large a portion of the wall surface of the polymerization vessel which cannot be usilized or utilized to an insufficient extent only for heating the polymerization mixture. Moreover, constructional difficulties and difficulties resulting from a higher wear of the insulating material by mechanical or chemical influences during use may occur.

The total area of all partial areas serving as electrode should be in the range of from 0.005 to 10%, preferably 0.01 to 1% and still more preferably 0.05 to 0.5% of the electrically conductive surfaces inside of the polymerization vessel. With an electrode area below 0.005% the current densities at the partial areas are too high, which has a detrimental effect on the process, while an electrode area above 10% would be possible, but entails constructional difficulties and is disadvantageous for economical reasons.

According to a further preferred embodiment of the apparatus of the invention several insulated partial surface areas of the stirrer serve as electrodes. These partial areas may cover entire blades or paddles of a stirrer with several blades or paddles as well as partial areas only of these individual blades or paddles.

The partial areas together with the surrounding insulating layer preferably have a shape such that they merge into the remaining surface areas without seam to form a three-dimensional body with continuously flowing homogeneous surface.

The insulated partial areas of the inner surface of the polymerization vessel can be fitted tightly in the form of a stopper in a short pipe section, suitably together with the surrounding insulating layer.

This arrangement has the advantage that the insulated partial areas can be rapidly removed when the vessel is empty, for example for cleaning purposes or for exchange.

If the stirring element carries the insulated partial areas serving as electrode, the external current source necessary to maintain the potential difference in the reaction vessel can be connected therewith, for example by a sliding ring. A contactless, inductive current trans- (a) with the remaining surface areas. By a corresponding change of connection partial areas (b) are then exchanged after some time wholly or partially with the partial areas (a). The additional potential difference produces a higher cleaning effect.

The process of the invention is suitable for the homo-, co-, and graft-polymerization of α-ethylenically unsaturated monomers initiated by free radicals, for example one or several of the following monomers: vinyl esters of straight-chain or branched carboxylic acids having from 2 to 20 and preferably 2 to 4 carbon atoms, for example vinyl acetate, vinyl propionate, vinyl butyrate, vinyl-2-ethyl hexoate, vinyl fumarate, vinyl stearate; vinyl ethers such as vinylmethyl ether; unsaturated monocarboxylic acids such as crotonic acid, acrylic acid and methyacrylic acid and the esters thereof with alcohols having from 1 to 10 carbon atoms such as the methyl, butyl or octyl ester; acrylonitrile; unsaturated dicarboxylic acids such as maleic acid, fumaric acid, and itaconic acid, the anhydrides thereof, their esters with alcohols having from 1 to 10 carbon atoms and the optionally N-substituted imides thereof; aromatic vinyl monomers such as styrene and substituted styrenes, for example α-methylstyrene; vinyl halides such as vinyl chloride, vinylidene chloride and vinyl fluoride. As coor graft components there can be used, besides the aforesaid monomers, α-olefins such as ethylene, propylene, butadiene. The process is especially suitable for the manufacture of homo-, co- and graft-polymers of vinyl chloride and acrylonitrile. Suitable co- and graft components are preferably the monomers listed above.

The comonomers are used in an amount of from 0.5 to 50% by weight, preferably 1 to 20% by weight and the graft monomers are used in an amount of from 0.5 to 30% by weight, preferably 1 to 15% by weight, the percentages being calculated on the total amount of monomers used.

As radical forming catalysts there are used from 0.001 to 3% by weight, preferably from 0.01 to 0.3% by weight, calculated on the monomers, of the following compounds mentioned by way of example: diaryl and diacyl peroxides such as diacetyl, acetylbenzoyl, dilauroyl, dibenzoyl, bis-2,4-dichlorobenzoyl and bis-2-methyl-benzoyl peroxides; dialkyl peroxides such as di-tert.-butyl peroxide; per-esters such as tert. butyl percarbonate, tert.butyl peracetate, tert.butyl peroctoate and tert-.butyl perpivalate; dialkyl peroxy dicarbonates such as diisopropyl, diethylhexyl, dicyclohexyl and diethylcyclohexyl peroxy dicarbonates; mixed anhydrides of organic sulfo-peracids and organic acids such as acetyl-cyclohexylsulfonyl peroxide; and azo compounds used as polymerization catalysts such as azoisobutyronitrile; persulfates, for example potassium, sodium and ammonium persulfates; hydrogen peroxide, tert.butyl hydroperoxide and other water-soluble peroxides, as well as mixtures of different catalysts. The peroxidic catalysts can also be used in the presence of from 0.01 to 1% by weight, calculated on the monomers, of at least one reducing substance suitable for the synthesis of a redox catalyst system, for example, sulfites, bisulfites, dithionites, thiosulfates, and aldehyde sulfoxylates, for example formaldehyde sulfoxylate. The polymerization can also be carried out in the presence of soluble metal salts, for example of copper, silver, iron, or chromium, in amounts of from 0.05 to 10 ppm., calculated as metal on the monomer(s).

The polymerization can also be carried out in the presence of from 0.01 to 1% and preferably 0.05 to 0.3% by weight, calculated on the monomers of at least one protective colloid, for example, polyvinyl alcohol which may still contain up to 40 mol% of acetyl groups, cellulose derivatives such as water-soluble methyl cellulose; carboxymethyl cellulose, hydroxyethyl cellulose, gelatin, copolymers of maleic acid or the semi esters thereof and styrenes, calcium triphosphate, magnesium hydroxide and other protective colloids.

The polymerization can also be carried out in the presence of from 0.01 to 5% by weight, calculated on the monomers, of one or more emulsifiers which may be used in admixture with the above protective colloids. Suitable emulsifiers, which may be anionic, or cationic, and preferably amphoteric or non-ionic, are, for example, alkali and alkaline earth metal and ammonium salts of fatty acids, for example of lauric, palmitic or stearic acid, of acid fatty alcohol sulfuric acid esters, paraffin sulfonic acids, alkylaryl sulfonic acids such as dodecylbenzene or dibutyl-naphthalene sulfonic acid, of sulfosuccinic acid dialkyl esters, as well as the alkali metal and ammonium salts of fatty acids containing epoxide groups, such as epoxy-stearic acid, of reaction products of peracids, for example per-acetic acid, with unsaturated fatty acids such as oleic acid or linoic acid, or unsaturated hydroxyl derivatives of fatty acids such as ricinoleic acid. Suitable cationic emulsifiers are, for example, alkyl pyridinium salts such as lauryl pyridinium hydrochloride, alkylammonium salts such as oxethyl-dodecyl ammonium chloride. As amphoteric or non ionic emulsifiers there can be used, for example, alkyl betains such as dodecyl betain, partial fatty acid esters of polyhydric alcohols such as glycerol monostearate, sorbitol monolaurate, oleate or palmitate, polyoxethylene esters of fatty alcohols or aromatic hydroxyl compounds; polyoxethylene esters of fatty acids and polypropylene oxide-polyethylene oxide condensation products.

Besides the catalysts, protective colloids and/or emulsifiers, the polymerization mixture may also contain buffer substances, for example alkali metal acetates, borax, alkali metal phosphates, alkali metal carbonates, ammonia, or ammonium salts of carboxylic acids; and molecular weight regulators, for example aliphatic aldehydes having from 2 to 4 carbon atoms, chloro- and bromo-hydrocarbons, for example di- and trichloroethylene, chloroform, bromoform and methylene chloride, and mercaptans, and optionally also substances exercising an influence on the size of the polymer grain, for example aliphatic alcohols having from 2 to 8 carbon atoms, metal oxides, such as silicium, magnesium or aluminium oxide, especially in the form of their hydrates, alkaline earth metal salts, for example the chlorides.

Further additives which can be used in the polymerization are named in Houben-Weyl "Methoden der organischen Chemie", 4th edition, 1961, volume 14/1, pages 170 to 190 and particularly pages 190 to 208, 216 to 297, 319 to 331, 411 to 429 and 772 to 775 and in the book by H. Kainer "Polyvinylchlorid und Vinylchlorid-Mischpolymerisate" edited 1965, pages 13 to 59.

The polymerization is carried out at a temperature in the range of from 10° to 90° C, preferably 30° to 80° C and more preferably 45° to 75° C, either discontinuously or continuously, optionally with the use of a pre-polymerized seed latex or of a pre-dispersed monomer suspension.

The process of the invention can be carried out in combination with one of the following steps:

mission is also possible, but mostly requires more technical expenditure.

The current source electrically connecting the insulated partial areas with the remaining surface areas is generally a direct-current source. In some cases the application of an intermittent direct-current of low frequency, for example 50 cycles per second or less, may be advantageous.

As compared to the known processes, the process of the invention offers the advantage that, besides the built-in elements required for the polymerization without current flow through the polymerization medium, no further built-in elements are required. In this manner a satisfactory current distribution is ensured without mixing of the polymerization mixture, for example by stirring, being hindered. There is no danger that electrodes break. Owing to the fact that the electrodes are subject to a relatively weak strain only when the polymerization mixture is rapidly stirred or the reaction vessel is cleaned with pressurized water and that the electrodes do practically not vibrate, chemically very stable but mechanically very sensitive insulating materials can be used, for example glass. The insulated partial areas of the inner surface of the polymerization vessel serving as electrodes have a compact and insensitive construction and can be rapidly mounted or exchanged.

By short-circuiting some of the electrodes with the remaining areas of the inner surface of the polymerization vessel or by connecting the said partial areas with a lower-reciprocal potential than the main potential, electrodes which are substantially free from deposit are available at any time, which electrodes can be exchanged without loss of time and capacity for electrodes which have become useless during polymerization. The electrodes which have become useless are subsequently regenerated. In this manner, polymerization can continued for long periods of time without emptying the polymerization vessel, which is especially important for continuous polymerization. With discontinuous polymerization, it is also advantageous that the polymerization vessel need not be opened, especially when physiologically harmful monomers are polymerized for example vinyl chloride, since the emission of remaining monomers into the atmosphere can thus be avoided.

Figure 2:
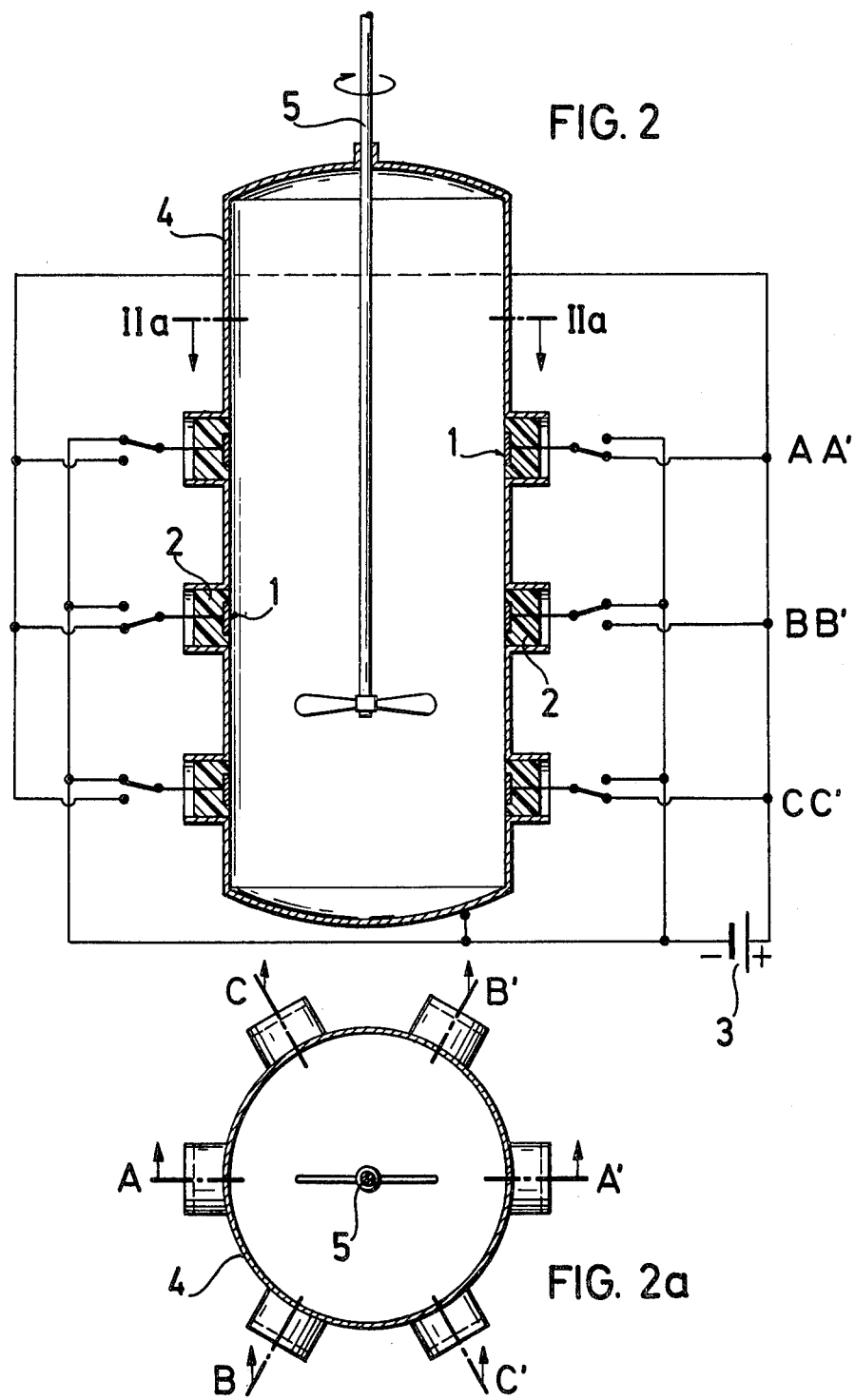
Figure 3:
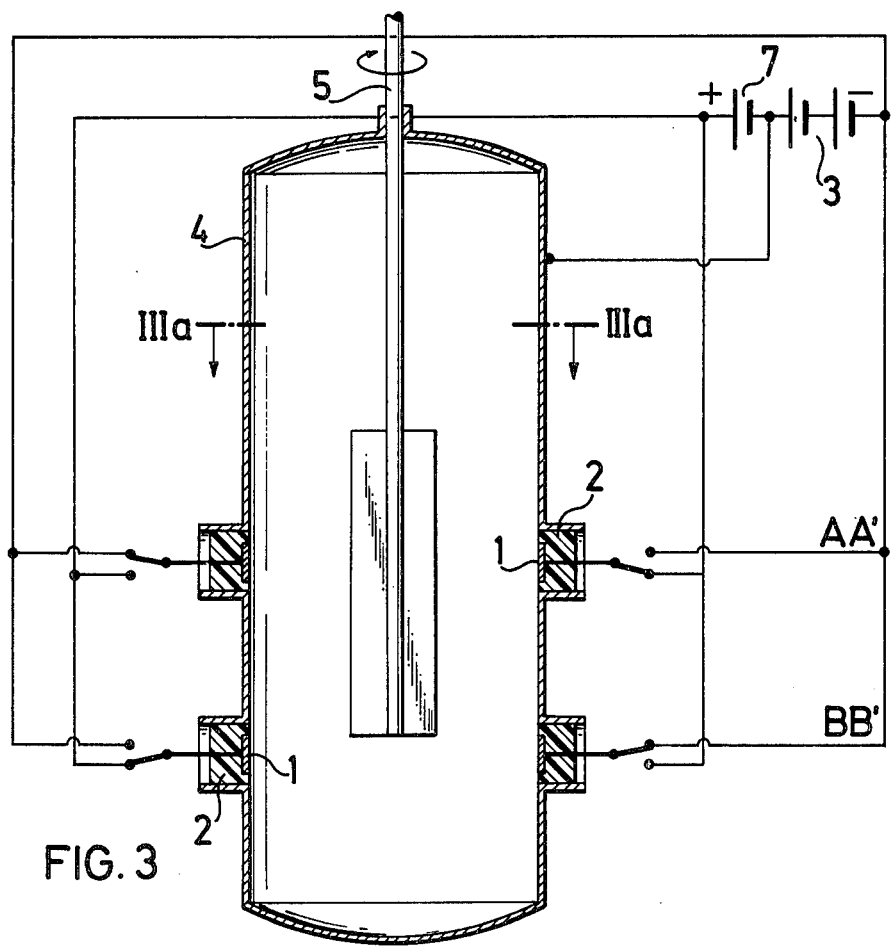
Figure 3A:
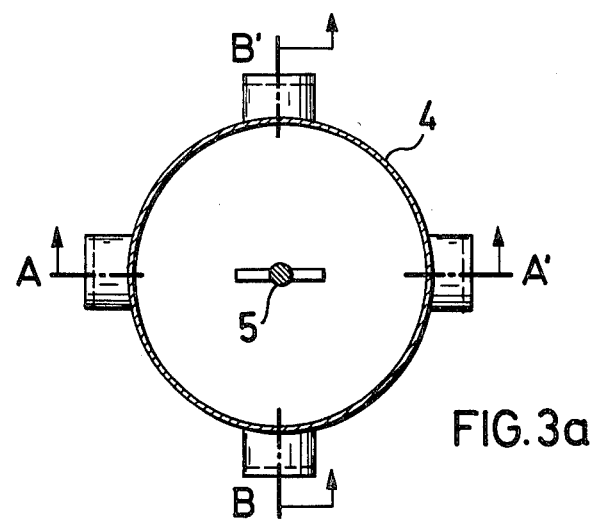
Figure 4:
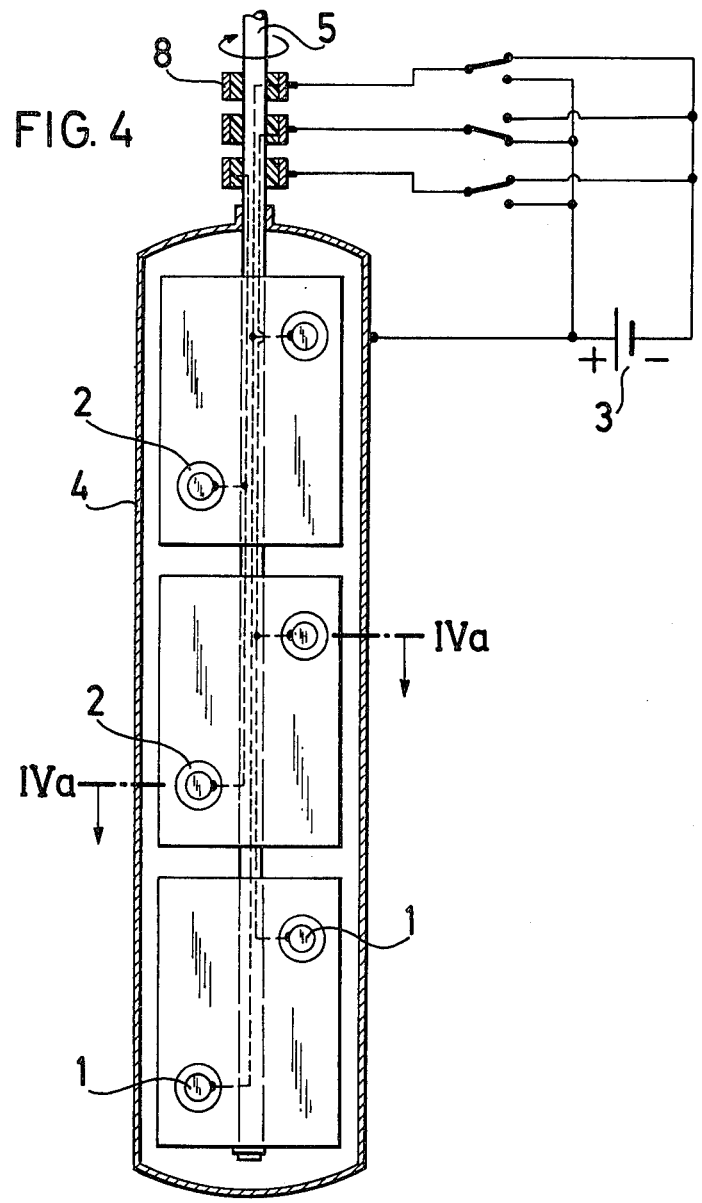
Figure 4A:
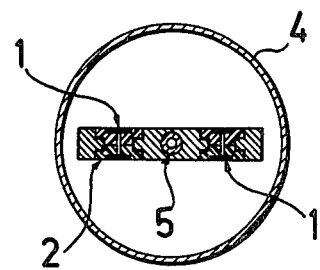

The invention will now be described in further detail and by way of example with reference to the accompanying drawings in which FIG. 1 is a side elevation of an apparatus according to the invention, FIG. 2 is a side elevation of a modified apparatus according to the invention, FIG. 2a is a cross sectional view of the apparatus shown in FIG. 2, FIG. 3 is a side elevation of a further modified apparatus according to the invention, FIG. 3a is a cross sectional view of the apparatus shown in FIG. 3, FIG. 4 is a side elevation of a further modification of the apparatus according to the invention and FIG. 4a is a cross sectional view of the apparatus shown in FIG. 4.

Referring to FIG. 1, in a polymerization vessel 4, provided with stirrer 5 and baffle 6, partial area 1 of the wall is insulated from the remaining surface areas by means of a stopper 2 made of an insulating material. This partial area 1 is in that part of the vessel which is covered with liquid during polymerization; it is electrically connected with the remaining surface areas of the reactor wall by an external direct-current source 3, the latter surface areas being connected as anode while the insulated partial area is connected as cathode.

In FIG. 2 the numerals have the same meaning as in FIG. 1. The polymerization vessel 4 contains 6 insulated partial areas 1 which are in staggered position each time two in three levels. All partial areas can be connected by choice by direct current source 3 to have a positive potential with respect to the remaining surface areas (on top right, center left, at bottom right) or short-circuited with the remaining surface areas (on top left, center right, at bottom left). In FIGS. 2 and 2a the three sectional planes AA', BB' and CC' are projected in the drawing plane.

Referring now to FIG. 3, the reactor has 4 insulated partial areas 1 in two different planes which can be connected by choice by direct current source 3 in a manner such that thex have a negative potential with respect to the remaining surface areas of the polymerization vessel 4 (on top left, at bottom right) or by direct current source 7 so that they have a smaller positive potential with respect to the remaining surface areas (on top right, at bottom left). In FIGS. 3 and 3a the two sectional planes AA' and BB' are also projected in the drawing plane.

According to FIG. 4 the apparatus comprises an oblong polymerization vessel 4 provided with a multiple blade stirrer 5. The three blades of the stirrer have two insulated partial areas 1 on either side, i.e., 12 altogether. The partial areas are supplied with direct current from current source 3 via the stirrer shaft and a column of sliding rings 8 mounted on the shaft section outside of the vessel. Each time two pairs of partial areas, i.e., each time 4 partial areas, are short-circuited with the surface of the polymerization vessel 4 or provided with a negative potential by direct-current source 3.

In all figures the usual equipment of polymerization vessels such a jacket for heating the contents of the vessel, reflux condenser, measuring means, regulating systems and the like are not shown for the sake of clarity.

The follwing examples illustrate the invention.

EXAMPLE 1

A polymerization vessel of stainless steel having a capacity of 1,600 liters, provided with stirrer and containing a platinized electrode in close contact with the wall as shown in FIG. 1 and insulated from the remaining surface areas, which electrode was in contact with the cathode of a direct current source, while the wall of the vessel was connected as as anode, was successively charged with 950 liters of desalted water
800 grams of polyvinyl alcohol
900 grams of Na$_2$HPO$_4$
450 grams of diisopropyl percarbonate (40% by weight solution in dibutyl phthalate) The starting mixture had a pH of 7.4.

The air in the polymerization vessel was removed by repeatedly evacuating and passing through a current of gaseous vinyl chloride, whereupon 450 kg of vinyl chloride were forced in. The reaction mixture was heated to 53° C while stirring and at said temperature polymerization was continued until the pressure had dropped to $\Delta p$ = 4 atmospheres gage. During polymerization a direct voltage potential of 50 volts was applied, the current intensity being 500 mA. The average current intensity at the wall of the vessel was found to be about 80 mA/m2.

After a polymerization period of about 7 hours, the reaction mixture was cooled, the pressure of the vessel released and the vessel was emptied. In this manner 10 batches were polymerized successively, whereupon the reaction vessel was opened. The wall of the vessel and the cathode were absolutely bright without any deposit.

COMPARATIVE EXPERIMENT A

Polymerization was carried out in a 1,600 liter vessel which did not contain an electrode with the substances specified in Example 1 but without passing an electrical current through the polymerization mixture. After polymerization of the first batch, a slight deposit was observed on the wall of the vessel. Without intermediate cleaning two further batches were polymerized in the same manner. Thereafter, the deposit on the wall of the vessel had a thickness of over 1 mm. The deposit adhered strongly and had to be removed manually.

EXAMPLE 2

A vessel as described in Example 1 was used with the exception that it contained two electrodes in close contact with the wall, insulated from the remaining surface areas and disposed opposite each other in the same level. Both electrodes could be short-circuited by choice with the remaining surface areas or connected via a direct-current source producing a negative potential difference with respect to the remaining surface areas. The wall of the vessel and one electrode were connected with the anode of the direct-current source while the other electrode was connected with the cathode.

The polymerization vessel was charged successively with
700 liters of desalted water
625 grams of methylhydroxypropyl cellulose, a 2% aqueous solution of which had a viscosity of 50 centiPoises
500 grams of $Na_2HPO_4$
500 grams of $H_3PO_4$
340 grams of lauryl peroxide
160 grams of diacetylcyclohexylsulfonyl peroxide (as 40% by weight solution in dibutyl phthalate)
The starting mixture had a pH of 3.4.

After removal of the air contained in the polymerization vessel, 51 kg of vinyl acetate and 450 kg of vinyl chloride were forced in. The reaction mixture was heated to 60° C while stirring and polymerization was continued at said temperature until the pressure had dropped to $\Delta p = 4$ atmospheres gage.

During polymerization a direct current voltage of 35 volt was applied, a current intensity of 330 mA being measured. The average current intensity at the wall of the vessel was about 60 mA/m².

After a polymerization period of about 9 hours, the reaction mixture was cooled, the pressure of the vessel was released and the vessel was emptied. In this manner 10 batches were successively polymerized. Each time after the polymerization of two batches, the polarity of the electrodes was reversed. After 10 batches the vessel was opened. The wall of the vessel and the electrode last short-circuited therewith were entirely bright, while the electrode last connected as cathode showed a slight deposit.

EXAMPLE 3

A 40 liter autoclave lined with stainless steel and provided with stirrer was charged successively with
28 liters of desalted water
12 grams of polyvinyl alcohol
45 grams of $H_3PO_4$
45 grams of $NaH_2PO_4$
13.5 grams of diisopropyl percarbonate (as 40% by weight solution in water)
The starting mixture had a pH of 2.7.

The polymerization vessel contained, in accordance with FIG. 1, a platinized electrode in close contact with the wall and insulated from the remaining surface areas serving as cathode, while the wall of the vessel was connected as anode. During polymerization a voltage of 20 volts was applied, resulting in a current intensity of 250 mA. The current density at the wall of the vessel was found to be 500 mA/m².

After removal of the air in the autoclave by repeatedly evecuating and passing through a current of gaseous vinyl chloride, 9 kg of vinyl chloride were forced in. The reaction mixture was heated to 53° C while stirring and polymerization was continued until the pressure had dropped to $\Delta p = 4$ atmospheres gage. After a polymerization period of 6 hours, the reaction mixture was cooled, the pressure of the vessel was released and the vessel was emptied. In this manner 10 batches were successively polymerized, whereupon the reaction vessel was opened. The wall of the reactor and the cathode were entirely bright.

EXAMPLE 4

A polymerization vessel as described in Example 3 was successively charged with
32 liters of desalted water
30 grams of hydroxypropyl cellulose
30 grams of the sodium salt of dodecylbenzene-sulfonic acid
56 grams of $H_3PO_4$
56 grams of $NaH_2PO_4$
16.5 grams of diisopropyl percarbonate (40% by weight aqueous solution)
The starting mixture had a pH of 2.7.

The electrode was connected as cathode and the wall of the vessel as anode, the voltage applied was 20 volts, resulting in a current intensity of 250 mA during polymerization. The current intensity at the wall of the vessel amounted to 500 mA/m². Polymerization was carried out under the conditions of Example 3. After 10 successively polymerized batches the internal wall of the vessel was still free from incrustations.

EXAMPLE 5

A polymerization vessel as described in Example 3 was successively charged with
23 liters of desalted water
12 grams of polyvinyl alcohol
56 grams of $H_3PO_4$
56 grams of $NaH_2P0_4$
16.5 grams of diisopropyl percarbonate (as 40% by weight aqueous solution)
The starting mixture had a pH of 2.7.

The electrode served as cathode, the wall of the vessel as anode, a voltage of 20 volts was applied, resulting in a current density of 250 mA, the current intensity at the wall of the vessel being 500 mA/m². After removal of the air in the autoclave by repeatedly evacuating and passing through a current of gaseous vinyl chloride, 9.5 kg of vinyl chloride and 1.65 kg of vinyl acetate were forced in. Polymerization was carried out under the conditions of Example 3. When the polymerization was terminated, the inner wall of the autoclave was fully free from deposit.

EXAMPLE 6

Polymerization was carried out as described in Example 5 using 10 kg of vinyl chloride and 1.1 kg of acrylonitrile. In this case, too, no deposit had formed on the wall when the polymerization was terminated.

EXAMPLE 7

A polymerization vessel as described in Example 3 was successively charged with
26 liters of desalted water
210 grams of sodium alkane-sulfonate
15 grams of $Na_2HPO_4$
1 gram of $NH_4OH$ (as 30% aqueous solution)
22.5 grams of potassium persulfate
The starting mixture had a pH of 9.5.

The platinized electrode served as cathode and the wall of the vessel as anode. During polymerization a voltage of 20 volts was applied, resulting in a current intensity of 250 mA, the current density at the wall of the vessel being 500 mA/m². After removal of the air contained in the autoclave by repeatedly evacuating and passing through a current of gaseous vinyl chloride, 15 kg of vinyl chloride were forced in. The reaction mixture was heated to 60° C while stirring and polymerization was continued until the pressure had dropped to $p = 4$ atmospheres gage. After a polymerization period of 3 hours, the reaction mixture was cooled, the pressure in the vessel was released and the vessel was emptied. When the reaction vessel was opened the wall had a contiguous but thin deposit.

What is claimed is:

1. In a process for polymerizing α-ethylenically unsaturated monomers in aqueous media in the presence of free radical forming catalysts and further polymerization auxiliaries in a vessel having an electrically conductive inner wall surface, the electrically conductive inner surface and the elements being electrically connected with at least one electrode insoluble in the liquid polymerization medium and electrically insulated from the wall of the polymerization vessel and the built-in elements, the improvement comprising at least one partial area of the inner wall surface of the vessel comprising the insoluble electrode, wherein the partial area is covered with liquid, is electrically insulated from the remaining surface areas and is provided with an electrical potential difference with respect to the remaining surface areas.

2. In a process for polymerizing α-ethylenically unsaturated monomers in aqueous media in the presence of free radical forming catalysts and further polymerization auxiliaries in a vessel having an electrically conductive inner surface and optionally provided with built-in elements, the electrically conductive inner surface and the elements being electrically connected with at least one electrode insoluble in the liquid polymerization medium and electrically insulated from the wall of the polymerization vessel and the built-in elements, the improvement comprising at least one partial area of the inner surface of the vessel and/or built-in elements being used as insoluble electrode, wherein the partial area is covered with liquid, is electrically insulated from the remaining surface areas and is provided with an electrical potential difference with respect to the remaining surface areas, at least one and preferably one-half of the insulated partial areas (a) have an electric potential difference with respect to the remaining surface areas and the other insulated partial areas (b) are short-circuited with the remaining surface areas and after some time the insulated partial areas with potential difference (a) are wholly or partially exchanged for the short-circuited partial areas (b) by change of circuit connection.

3. The process of claim 2, whereien the insulated partial areas (b) are not short-circuited with the remaining surface areas but connected therewith via a second current source producing a potential difference with inverse sign with respect to the current source connecting partial areas (a) with the remaining surface areas and after some time the partial areas (b) are wholly or partially exchanged for partial areas (a) by change of circuit connection.

4. In a process for polymerizing α-ethylenically unsaturated monomers in aqueous media in the presence of free radical forming catalysts and further polymerization auxiliaries in a vessel having an electrically conductive inner surface and optionally provided with built-in elements, the electrically conductive inner surface and the elements being electrically connected with at least one electrode insoluble in the liquid polymerization medium and electrically insulated from the wall of the polymerization vessel and the built-in elements, the improvement comprising at least one partial area of the inner surface of the vessel and/or built-in elements being used as insoluble electrode, wherein the partial area is covered with liquid, is electrically insulated from the remaining surface areas and is provided with an electrical potential difference with respect to the remaining surface areas, 2 to 24 partial areas are insulated from the remaining surface areas.

* * * * *